US008707672B2

(12) United States Patent
Zuo et al.

(10) Patent No.: US 8,707,672 B2
(45) Date of Patent: Apr. 29, 2014

(54) APPARATUS AND METHOD FOR COOLING A COMBUSTOR CAP

(75) Inventors: Baifang Zuo, Simpsonville, SC (US); Roy Marshall Washam, Clinton, SC (US); Chunyang Wu, Greer, SC (US)

(73) Assignee: General Electric Company, Schenectady, NY (US)

( * ) Notice: Subject to any disclaimer, the term of this patent is extended or adjusted under 35 U.S.C. 154(b) by 852 days.

(21) Appl. No.: 12/879,238

(22) Filed: Sep. 10, 2010

(65) Prior Publication Data

US 2012/0060511 A1 Mar. 15, 2012

(51) Int. Cl.
*F02C 3/00* (2006.01)

(52) U.S. Cl.
USPC .......... 60/39.37; 60/752

(58) Field of Classification Search
USPC .......... 60/39.37, 752–760, 806
See application file for complete search history.

(56) References Cited

U.S. PATENT DOCUMENTS

| | | | | |
|---|---|---|---|---|
| 4,887,963 | A * | 12/1989 | LeMer | 431/354 |
| 5,339,635 | A * | 8/1994 | Iwai et al. | 60/733 |
| 5,941,076 | A * | 8/1999 | Sandelis | 60/752 |
| 7,343,745 | B2 * | 3/2008 | Inoue et al. | 60/737 |
| 7,581,401 | B2 | 9/2009 | West et al. | |
| 8,438,853 | B2 * | 5/2013 | Green et al. | 60/746 |
| 2003/0010032 | A1 * | 1/2003 | Stuttaford et al. | 60/737 |
| 2010/0218501 | A1 * | 9/2010 | York et al. | 60/737 |
| 2011/0067379 | A1 * | 3/2011 | Khan et al. | 60/39.463 |

* cited by examiner

*Primary Examiner* — Phutthiwat Wongwian
(74) *Attorney, Agent, or Firm* — Dority & Manning, PA

(57) ABSTRACT

A combustor includes an end cap having a perforated downstream plate and a combustion chamber downstream of the downstream plate. A plenum is in fluid communication with the downstream plate and supplies a cooling medium to the combustion chamber through the perforations in the downstream plate. A method for cooling a combustor includes flowing a cooling medium into a combustor end cap and impinging the cooling medium on a downstream plate in the combustor end cap. The method further includes flowing the cooling medium into a combustion chamber through perforations in the downstream plate.

13 Claims, 6 Drawing Sheets

APPARATUS AND METHOD FOR COOLING A COMBUSTOR CAP

FEDERAL RESEARCH STATEMENT

This invention was made with Government support under Contract No. DE-FC26-05NT42643, awarded by the Department of Energy. The Government has certain rights in the invention.

FIELD OF THE INVENTION

The present invention generally involves an apparatus and method for cooling a combustor. Specific embodiments of the present invention may supply cooling through a combustor cap to provide cooling to the downstream surface of the combustor cap, reduce undesirable emissions, and/or reduce the occurrence of flame holding or flash back.

BACKGROUND OF THE INVENTION

Gas turbines are widely used in industrial and power generation operations. A typical gas turbine includes an axial compressor at the front, one or more combustors around the middle, and a turbine at the rear. Ambient air enters the compressor, and rotating blades and stationary vanes in the compressor progressively impart kinetic energy to the working fluid (air) to produce a compressed working fluid at a highly energized state. The compressed working fluid exits the compressor and flows through nozzles in the combustors where it mixes with fuel and ignites to generate combustion gases having a high temperature, pressure, and velocity. The combustion gases expand in the turbine to produce work. For example, expansion of the combustion gases in the turbine may rotate a shaft connected to a generator to produce electricity.

It is widely known that the thermodynamic efficiency of a gas turbine increases as the operating temperature, namely the combustion gas temperature, increases. However, if the fuel and air are not evenly mixed prior to combustion, localized hot spots may form in the combustor near the nozzle exits. The localized hot spots increase the chance for flame flash back and flame holding to occur which may damage the nozzles. Although flame flash back and flame holding may occur with any fuel, they occur more readily with high reactive fuels, such as hydrogen, that have a higher burning rate and wider flammability range. The localized hot spots may also increase the production of nitrous oxides in the fuel rich regions, while the fuel lean regions may increase the production of carbon monoxide and unburned hydrocarbons, all of which are undesirable exhaust emissions.

A variety of techniques exist to allow higher operating temperatures while minimizing localized hot spots and undesirable emissions. For example, various nozzles have been developed to more uniformly mix higher reactivity fuel with the working fluid prior to combustion. The higher burning rate of higher reactivity fuel, however, still creates an environment conducive to flame flash back and/or flame holding events. As a result, continued improvements in cooling provided to a combustor cap to cool the combustor cap, reduce undesirable emissions, and/or reduce the occurrence of flame holding or flash back would be useful.

BRIEF DESCRIPTION OF THE INVENTION

Aspects and advantages of the invention are set forth below in the following description, or may be obvious from the description, or may be learned through practice of the invention.

One embodiment of the present invention is a combustor that includes an end cap. The end cap includes an upstream plate, a downstream plate adjacent to the upstream plate, and a passage between the upstream and downstream plates. The downstream plate includes perforations. A combustion chamber is downstream of the downstream plate. A plenum that passes through the upstream plate supplies a cooling medium to the passage between the upstream and downstream plates.

Another embodiment of the present invention is a combustor having an end cap. The end cap includes a downstream plate having perforations. A combustion chamber is downstream of the downstream plate. A plenum is in fluid communication with the downstream plate and supplies a cooling medium to the combustion chamber through the perforations in the downstream plate.

Embodiments of the present invention also include a method for cooling a combustor. The method includes flowing a cooling medium into a combustor end cap and impinging the cooling medium on a downstream plate in the combustor end cap. The method further includes flowing the cooling medium into a combustion chamber through perforations in the downstream plate.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
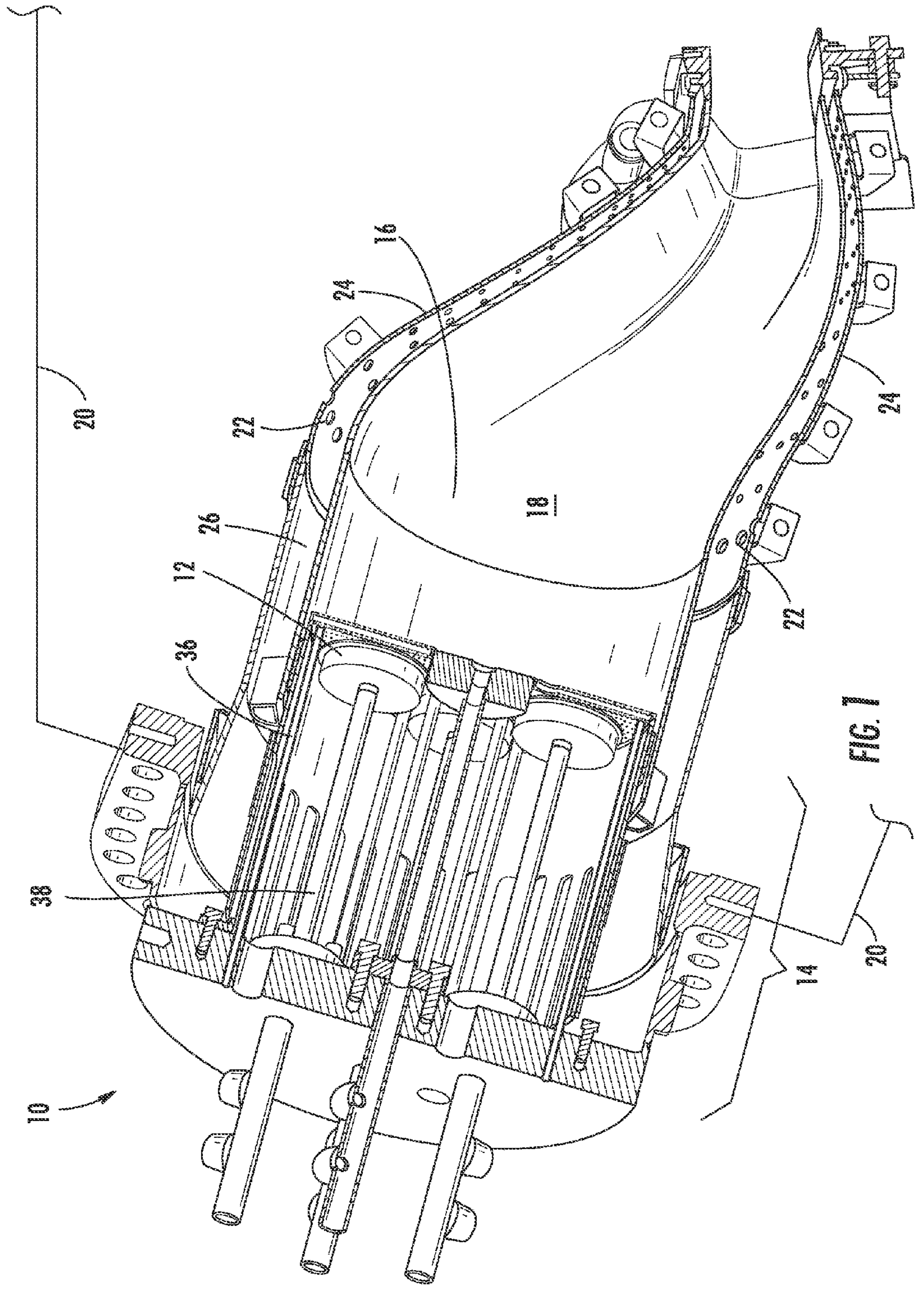
FIG. 1 is a perspective cutaway of a combustor according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a combustor having a plenum that supplies a cooling medium to a combustor cap. The cooling medium may comprise any fluid that can transfer heat from the combustor cap, such as nitrogen, another inert gas, or even steam. The cooling medium removes heat from the combustor cap through impingement cooling. In addition, the cooling medium flows through perforations in the combustor cap to form a thin protective layer on the combustion chamber side of the combustor cap. The thin layer of cooling medium on the combustion chamber side of the combustor cap may protect the surface of the combustor cap from overheating, reduce the peak temperature in the combustor, reduce the occurrence of flame holding and flash back, and/or reduce undesirable emissions from the combustor.

FIG. 1 shows a cutaway perspective view of a combustor 10 according to one embodiment of the present invention. As shown, the combustor 10 generally includes one or more nozzles 12 radially arranged in an end cap 14. For clarity, the nozzles 12 are illustrated in the figures as cylinders without any detail with respect to the type, configuration, or internal components of the nozzles 12. One of ordinary skill in the art will readily appreciate that the present invention is not limited to any particular nozzle type, shape, or design unless specifically recited in the claims. A liner 16 defines a combustion chamber 18 downstream of the end cap 14. A casing 20 surrounding the combustor 10 contains air or compressed working fluid flowing into the combustor 10. The air or compressed working fluid flows through holes 22 in a flow sleeve 24 into an annular passage 26. The air or compressed working fluid then flows through the annular passage 26 and into the end cap 14 where it reverses direction to flow through the nozzles 12 and into the combustion chamber 18.

Figure 2:
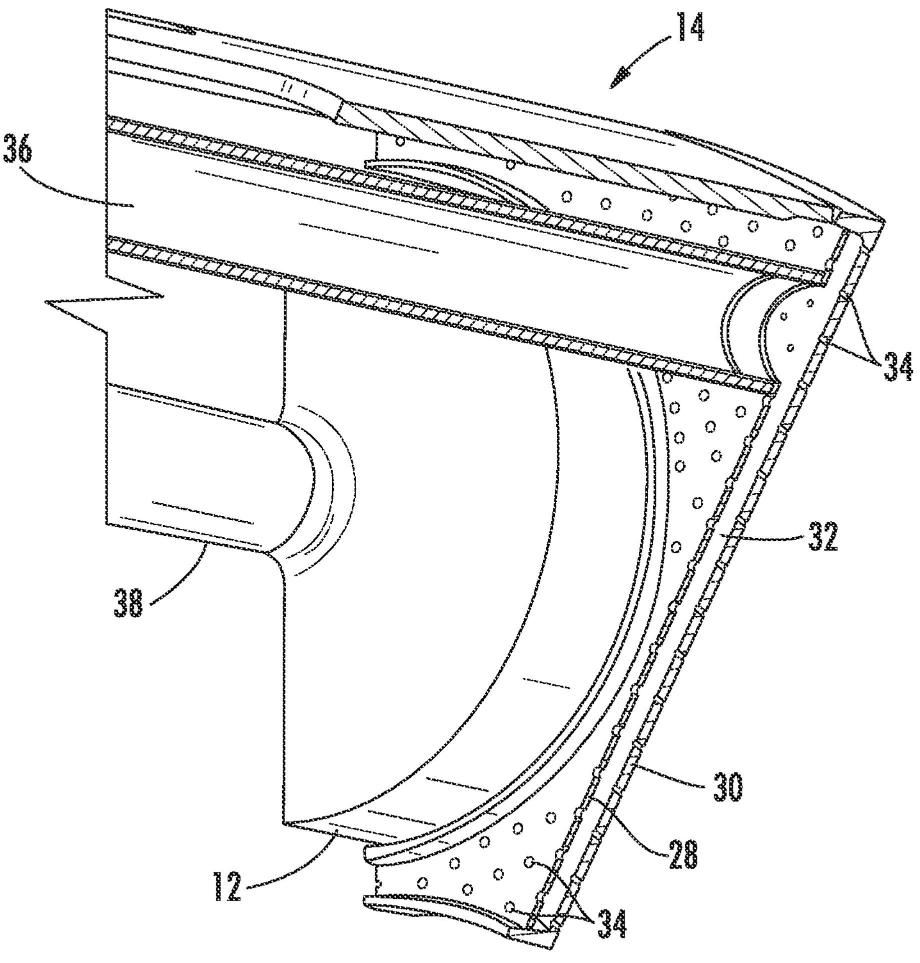
FIG. 2 is an enlarged downstream perspective view of a portion of the combustor cap shown in FIG. 1.
Figure 3:
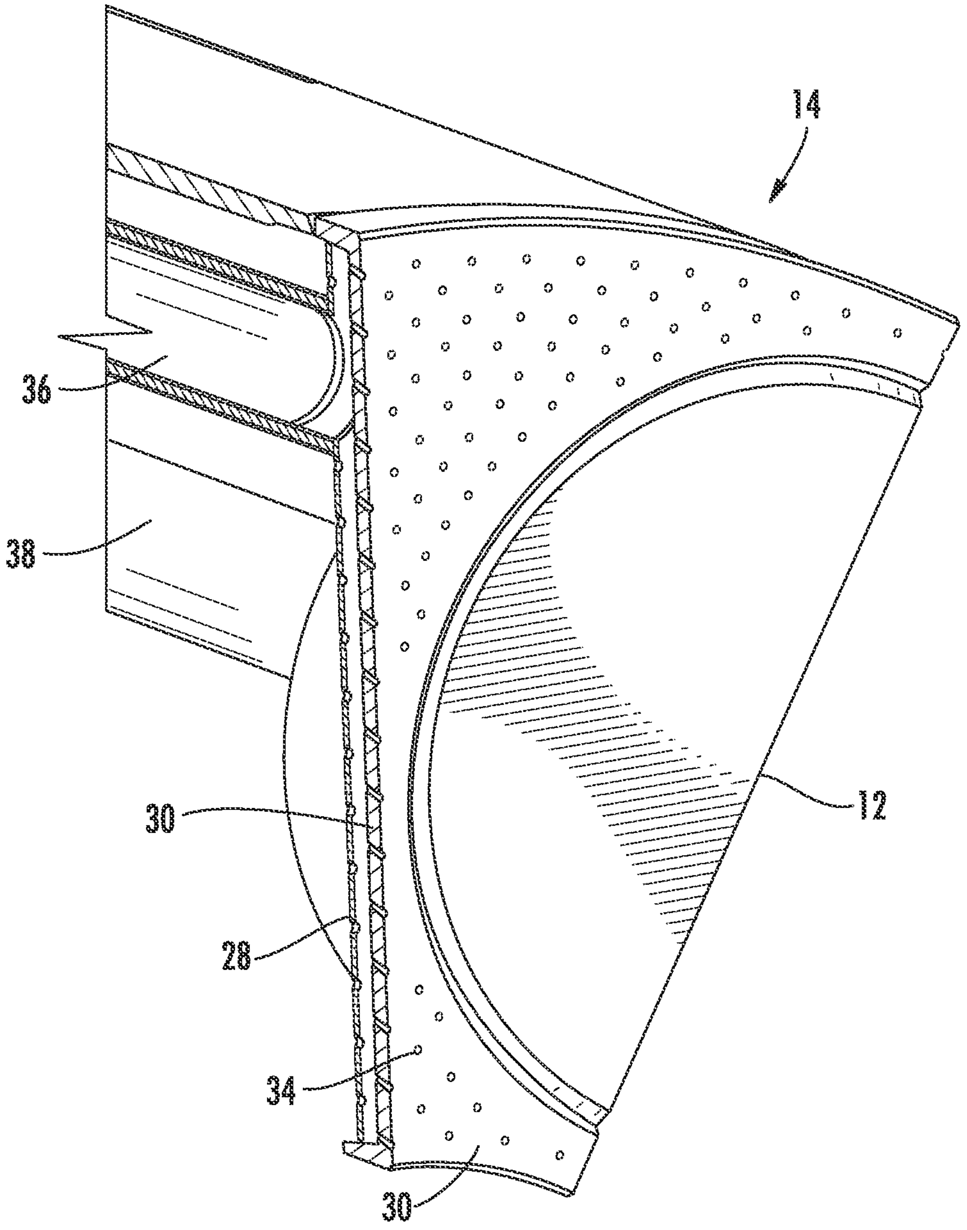
FIG. 3 is an enlarged upstream perspective view of a portion of the combustor cap shown in FIG. 1.

FIGS. 2 and 3 provide enlarged downstream and upstream views of a portion of the end cap 14 shown in FIG. 1. As shown, the end cap 14 generally includes an upstream plate 28, a downstream plate 30 adjacent to the upstream plate 28, and a passage 32 between the upstream and downstream plates 28, 30. The upstream and downstream plates 28, 30 generally extend across the width of the downstream portion of the end cap 14 to separate the air or compressed working fluid entering the end cap 14 from the downstream combustion chamber 18. The upstream and downstream plates 28, 30 are typically fabricated from alloys, superalloys, coated ceramics, or other material capable of withstanding temperatures of approximately 1,600 degrees Fahrenheit. However, the flame temperature in the combustion chamber 18 often exceeds 2,800-3,000 degrees Fahrenheit. Therefore, the upstream and downstream plates 28, 30 generally benefit from a source of cooling that can prevent damage to the upstream and downstream plates 28, 30 due to the high temperatures present in the combustion chamber 18.

The upstream and/or downstream plates 28, 30 may include a plurality of perforations 34. For example, as shown in FIGS. 2 and 3, both the upstream and downstream plates 28, 30 may include a plurality of perforations 34. The perforations 34 in the downstream plate 30 may be smaller than and angled with respect to the perforations 34 in the upstream plate 28. In this manner, the compressed working fluid flowing through the passage 26 and into the end cap 14 may flow through the perforations 34 in the upstream plate 28 to provide impingement cooling on the downstream plate 30. The compressed working fluid may then flow through the perforations 34 in the downstream plate 30 to provide film cooling to the combustion chamber 18 side of the downstream plate 30.

One or more plenums 36 are in fluid communication with the upstream plate 28, the downstream plate 30, and/or the passage 32. For example, as shown in FIGS. 1 through 3, each plenum 36 may pass through at least a portion of the end cap 14 substantially parallel to conduits 38 that supply fuel to the nozzles 12. In this manner, the plenums 36 are radially arranged between nozzles 12 in the end cap 14. Each plenum 36 may further pass through the upstream plate 28 to provide a fluid pathway through the plenum 36 to the upstream plate 28, the downstream plate 30, and into the passage 32. Each plenum 36 supplies a cooling medium to the passage 32 between the upstream and downstream plates 28, 30. The cooling medium may comprise any fluid capable of removing heat, such as nitrogen, another inert gas, or steam. Each plenum 36 may supply the same cooling medium, or a different cooling medium may be supplied through different plenums 36, depending on the operational needs and availability of the cooling medium.

The cooling medium generally flows through each plenum 36 into the passage 32 and cools the downstream portion of the end cap 14 by providing impingement cooling to the upstream and downstream plates 28, 30. The cooling medium may then flow out of the passage 32 through the perforations 34 in the upstream and/or downstream plates 28, 30. The cooling medium that flows through the perforations 34 in the downstream plate 30 may provide one or more additional benefits. For example, the cooling medium may form a thin layer of inert gas or steam on the combustion chamber 18 side of the downstream plate 30. This thin layer of inert gas or steam provides a protective barrier between the high temperature combustion occurring in the combustion chamber 18 and the downstream portion of the end cap 14, thus reducing the surface temperature of the end cap 14. In addition, the protective barrier provided by the cooling medium may allow more time for the fuel and air exiting the nozzles 12 to mix prior to combustion, resulting in more even and complete combustion of the fuel-air mixture. The protective barrier provided by the cooling medium may also prevent the combustion flame from passing through the protective barrier, reducing the occurrence of flame holding or flash back inside the nozzles 12. Lastly, the inert gas or steam eventually mixes with the fuel-air mixture exiting the nozzles 12, reducing the peak temperature of the combustion gases. The reduced peak temperature of the combustion gases results in reduced undesirable emissions for the same average combustion temperature.

Figure 4:
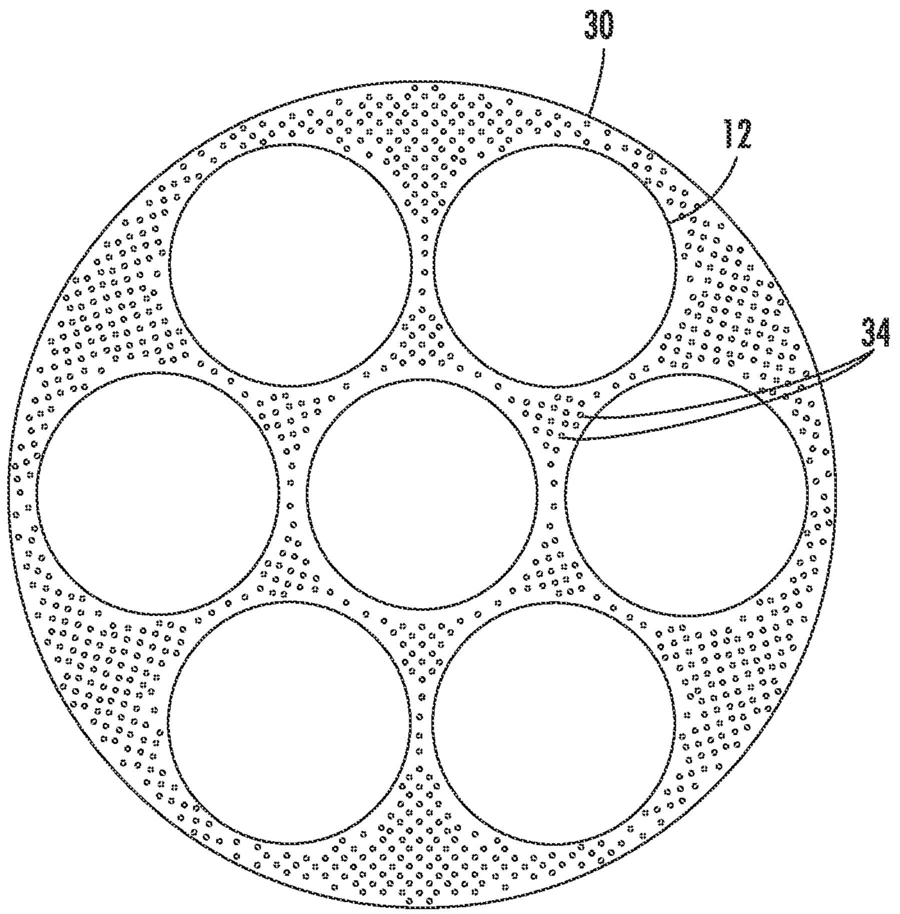
FIG. 4 is an upstream image of the cooling medium across a combustor cap when the pressure of the cooling medium is slightly less than the working fluid pressure upstream of the combustor cap.
Figure 5:
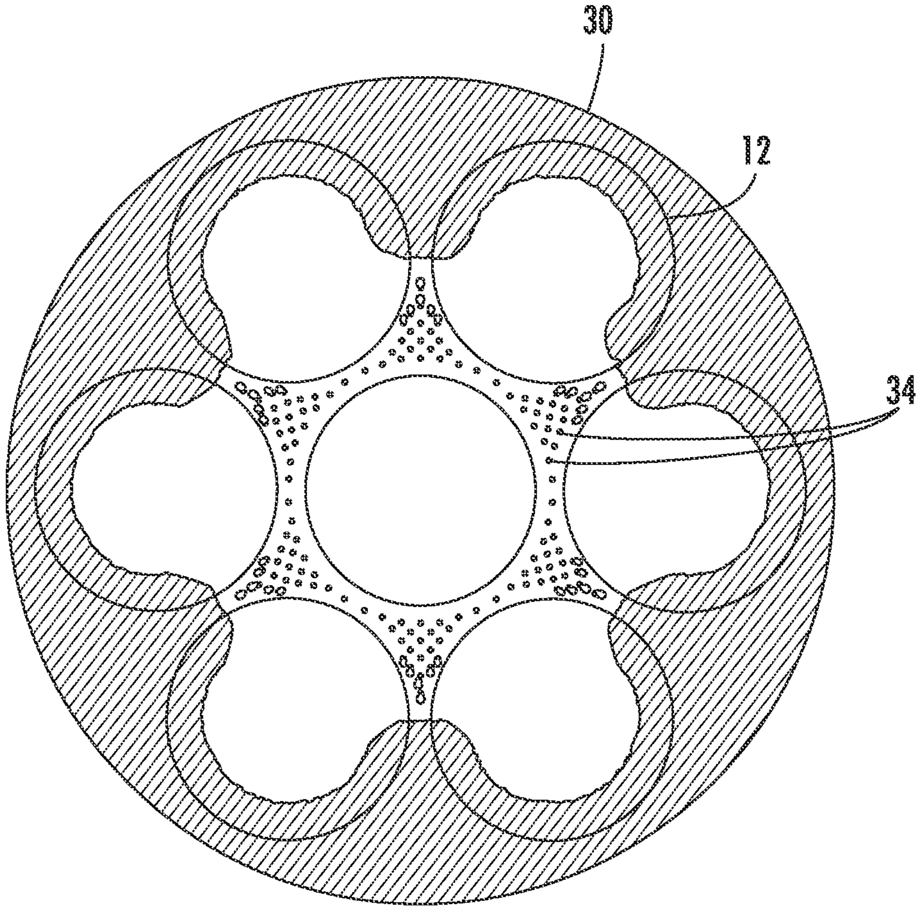
FIG. 5 is an upstream image of the cooling medium across a combustor cap when the pressure of the cooling medium is approximately equal to the working fluid pressure upstream of the combustor cap.
Figure 6:
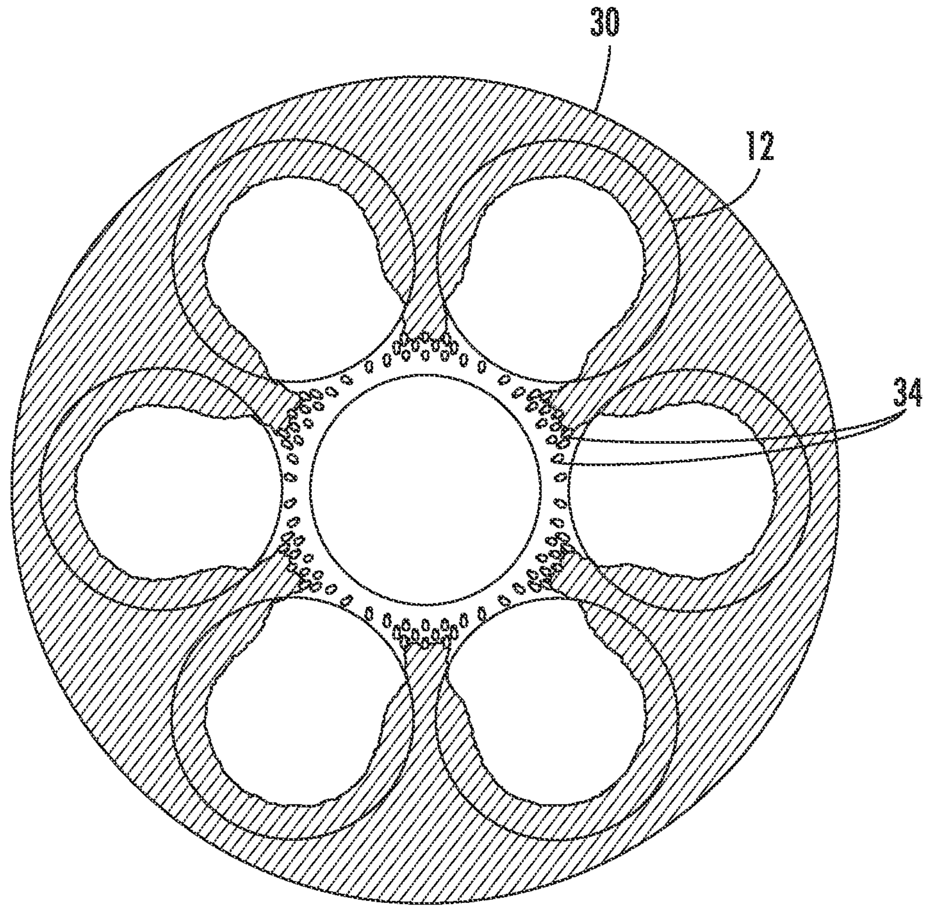
FIG. 6 is an upstream image of the cooling medium across a combustor cap when the pressure of the cooling medium is slightly greater than the working fluid pressure upstream of the combustor cap.

FIGS. 4, 5, and 6 illustrate upstream images of the cooling medium across the end cap 14 according to mathematical models for various flow rates and/or pressures of the cooling medium. For example, in FIG. 4, the pressure of the cooling medium is less than the pressure of the compressed working fluid inside the end cap 14. The situation may exist, for example, when the cooling medium is either not available or not required to provide cooling for the end cap 14. The greater pressure of the compressed working fluid inside the end cap 14 effectively prevents any cooling medium from flowing through the plenum 36 and into the passage 32. As a result, the cooling medium is not present on the combustion chamber side 18 of the downstream plate 30, and the compressed working fluid supplies cooling to the end cap 14. Specifically, the compressed working fluid flows through the perforations 34 in the upstream plate 28 to provide impingement cooling on the downstream plate 30. The compressed working fluid may then flow through the perforations 34 in the downstream plate 30 to provide film cooling to the combustion chamber 18 side of the downstream plate 30.

In FIG. 5, the pressure of the cooling medium is approximately equal to the pressure of the compressed working fluid inside the end cap 14. The situation may exist, for example, when some additional cooling from the cooling medium is desired to provide cooling for the end cap 14. The approximately equal pressure between the cooling medium and the compressed working fluid inside the end cap 14 allows the cooling medium to flow from each plenum 36 into the passage 32. The cooling medium thus provides some impingement cooling, along with that provided by the compressed working fluid flowing through the perforations 34 in the upstream plate 28, to the upstream side of the downstream plate 30. In addition, the cooling medium flows with the compressed working fluid into the combustion chamber 18 through the perforations 34 in the downstream plate 30. As a result, the cooling medium is present across portions of the combustion chamber 18 side of the downstream plate 30. As shown in FIG. 5, in general, the cooling medium may form a thin film layer (indicated by the shaded area) in the vicinity of the plenums 36, and the compressed working fluid may form a thin film layer (indicated by the unshaded area) further from the plenums 36 and toward the radial center of the end cap 14.

In FIG. 6, the pressure of the cooling medium is greater than the pressure of the compressed working fluid inside the end cap 14. The situation may exist, for example, when maximum additional cooling from the cooling medium is desired to provide cooling for the end cap 14. The greater pressure of the cooling medium effectively prevents any compressed working fluid from flowing into the passage 32 through the perforations 34 in the upstream plate 28. As a result, the cooling medium flows through each plenum 36 into the passage 32 to provide impingement cooling on the downstream plate 30. The cooling medium then flows through the perforations 34 and the upstream and downstream plates 28, 30. The cooling medium flow through the downstream plate 30 provides film cooling to the combustion chamber 18 side of the downstream plate 30. As a result, the cooling medium is present across larger portions of the combustion chamber 18 side of the downstream plate 30 then for the condition shown in FIG. 5. As shown in FIG. 6, in general, the cooling medium may form a thin film layer (indicated by the shaded area) across the entire combustion chamber 18 side of the downstream plate 30, with the exception of the radial center of the end cap 14.

Embodiments of the present invention may also provide a method for cooling the end cap 14 of the combustor 10. For example, the end cap 14 of the combustor 10 may be cooled by flowing the cooling medium into the end cap 14 and impinging the cooling medium on the downstream plate 30. The method may further include flowing the cooling medium into the combustion chamber 18 through perforations 34 in the downstream plate 30. In particular embodiments the method may further include impinging the cooling medium on the upstream plate 28 and/or flowing the cooling medium through the passage 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A combustor comprising:

a. an end cap, wherein the end cap includes an upstream plate, a downstream plate adjacent to the upstream plate, a cooling flow passage defined between the upstream and downstream plates and a fuel nozzle passage that extends continuously through the upstream and downstream plates and the cooling flow passage, wherein the cooling flow passage is fluidly isolated from the fuel nozzle passage;

b. perforations in the downstream plate;

c. a combustion chamber downstream of the downstream plate; and d. a plenum that passes through the upstream plate, wherein the plenum supplies a cooling medium to the passage between the upstream and downstream plates.

2. The combustor as in claim 1, further comprising perforations in the upstream plate.

3. The combustor as in claim 2, wherein the perforations in the downstream plate are angled with respect to the perforations in the upstream plate.

4. The combustor as in claim 1, Wherein the cooling medium comprises an inert gas.

5. The combustor as in claim 1, wherein the cooling medium comprises steam.

6. The combustor as in claim 1, wherein the cooling medium has a first pressure and the end cap has a second pressure, and the first pressure of the cooling medium is greater than the second pressure of the end cap.

7. The combustor as in claim 1, further including a plurality of plenums that pass through the upstream plate, wherein each of the plurality of plenums supplies the cooling medium to the passage between the upstream and downstream plates.

8. A combustor comprising:

a. an end cap, wherein the end cap includes an upstream plate, a downstream plate adjacent to the upstream plate, a cooling flow passage defined between the upstream and downstream plates and a fuel nozzle passage that extends continuously through the upstream and downstream plates and the cooling flow passage, wherein the cooling flow passage is fluidly isolated from the fuel nozzle passage;

b. perforations in the downstream plate;

c. a combustion chamber downstream of the downstream plate; and d. a plenum in fluid communication with the cooling passage, wherein the plenum supplies a cooling medium to the combustion chamber through the perforations in the downstream plate.

9. The combustor as in claim 8, further comprising perforations in the upstream plate.

10. The combustor as in claim 8, wherein the cooling medium comprises an inert gas.

11. The combustor as in claim 8, wherein the cooling medium comprises steam.

12. The combustor as in claim 8, wherein the cooling medium has a first pressure and the end cap has a second pressure, and the first pressure of the cooling medium is greater than the second pressure of the end cap.

13. The combustor as in claim 8, further including a plurality of plenums in fluid communication with the downstream plate.

* * * * *